United States Patent
Steiner

(10) Patent No.: US 8,158,176 B2
(45) Date of Patent: Apr. 17, 2012

(54) MEAT PROCESSING

(75) Inventor: Rudy Steiner, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 273 days.

(21) Appl. No.: 11/922,967

(22) PCT Filed: Jun. 30, 2006

(86) PCT No.: PCT/US2006/025879
§ 371 (c)(1),
(2), (4) Date: Dec. 26, 2007

(87) PCT Pub. No.: WO2007/005772
PCT Pub. Date: Jan. 11, 2007

(65) Prior Publication Data
US 2009/0092717 A1    Apr. 9, 2009

Related U.S. Application Data

(60) Provisional application No. 60/695,904, filed on Jul. 1, 2005.

(51) Int. Cl.
*A23B 4/16* (2006.01)
(52) U.S. Cl. ........ 426/263; 426/264; 426/312; 426/315; 426/520
(58) Field of Classification Search .................. 426/263, 426/312, 316, 129, 646, 478, 520, 264, 480, 426/417, 518
See application file for complete search history.

(56) References Cited

U.S. PATENT DOCUMENTS

| | | | |
|---|---|---|---|
| 2,229,360 A | 1/1941 | Baer | |
| 2,374,805 A | 5/1945 | Camelford | |
| 3,118,773 A | 1/1964 | Bennett et al. | |
| 3,122,748 A | 2/1964 | Beebe, P. | |
| 3,459,117 A | 8/1969 | Koch et al. | |
| 3,930,040 A | 12/1975 | Woodruff | |
| 4,001,446 A | 1/1977 | Hood | |
| 4,089,983 A | 5/1978 | Hood | |
| 4,522,835 A * | 6/1985 | Woodruff et al. | 426/264 |
| 5,433,142 A | 7/1995 | Roth | |
| 5,514,392 A | 5/1996 | Garwood | |
| 5,725,897 A | 3/1998 | Schaefer et al. | |
| 5,916,613 A | 6/1999 | Stockley, III | |
| 5,965,184 A * | 10/1999 | Schaefer et al. | 426/417 |

(Continued)

FOREIGN PATENT DOCUMENTS

GB    1589501    5/1981

(Continued)

OTHER PUBLICATIONS

"Low Oxygen Ground Beef Chub Package Analysis (Preliminary Study)," Clear Lam Packaging, Inc., PT Packaging Technologies, Henry & Sons, Inc., 2 pgs. (2003).

(Continued)

*Primary Examiner* — Drew Becker
*Assistant Examiner* — Preston Smith

(57) ABSTRACT

The present invention relates to the use of carbon monoxide as a process aid to ameliorate the loss of red color of fat-beef-trimmings while they are heat treated to produce finely textured beef. Finely textured beef, sometimes known as fat reduced beef, is produced from trimmings. The finely textured beef may be exposed to an elevated level of carbon monoxide before, during, or after the finely textured beef is heated to improve the final color of the finely textured beef product.

21 Claims, 8 Drawing Sheets

U.S. PATENT DOCUMENTS

| | | | |
|---|---|---|---|
| 5,972,401 A | 10/1999 | Kowalski | |
| 5,989,610 A | 11/1999 | Ruzek | |
| 6,042,859 A | 3/2000 | Shaklai | |
| 6,061,998 A | 5/2000 | Gorlich | |
| 6,099,891 A * | 8/2000 | Gundlach et al. | 426/646 |
| 6,210,730 B1 | 4/2001 | Mitchell | |
| 6,270,829 B1 * | 8/2001 | Shaklai | 426/129 |
| 6,331,322 B1 | 12/2001 | Shih et al. | |
| 6,521,275 B1 | 2/2003 | Mercogliano et al. | |
| 6,569,482 B2 | 5/2003 | Schaefer et al. | |
| 6,627,273 B2 | 9/2003 | Wolf et al. | |
| 6,685,549 B2 | 2/2004 | Henry et al. | |
| 6,713,104 B1 | 3/2004 | Kowalski | |
| 6,713,108 B2 | 3/2004 | Roth | |
| 6,767,277 B2 | 7/2004 | Henry et al. | |
| 6,777,012 B2 | 8/2004 | Olson et al. | |
| 6,818,873 B2 | 11/2004 | Savage et al. | |
| 7,141,256 B2 | 11/2006 | Noel et al. | |
| 2003/0054072 A1 | 3/2003 | Merriman et al. | |
| 2003/0054073 A1 | 3/2003 | DelDuca et al. | |
| 2003/0165602 A1 | 9/2003 | Garwood | |
| 2005/0025865 A1 | 2/2005 | Foulke | |
| 2007/0087111 A1 | 4/2007 | Steiner | |

FOREIGN PATENT DOCUMENTS

| | | |
|---|---|---|
| GB | 2264220 | 8/1993 |
| JP | 200178216 | 11/1983 |
| JP | 05-003752 | 1/1993 |
| JP | 5003752 | 1/1993 |
| JP | 2001178216 | 7/2001 |
| WO | 96/33096 | 10/1996 |
| WO | 9633096 | 10/1996 |
| WO | 03/063599 | 8/2003 |
| WO | 03063599 | 8/2003 |
| WO | 2007005772 | 1/2007 |

OTHER PUBLICATIONS

"Breaking new ground," Henry & Sons Inc., The National PROVISIONER/Meat & Deli Retailer—Hamburger Supplement, Jul. 2004, 1 pg.

"Farm to Fork . . . With Excel," EXCEL CORPORATION, vol. 4, No. 4, Sep. 1999, 2 pgs.

Farm to Fork . . . With Excel, EXCEL CORPORATION, vol. 4, No. 2, Jan. 1999, 2 pgs.

Watts, et al., "Fate of [14C] carbon monoxide in cooked or stored ground beef samples," Journal of Agricultural and Food Chemistry, vol. 26, No. 1, 1978, pp. 210-214.

International Search Report for PCT/US2006/025879 mailed Dec. 18, 2006 (3 pages).

"Frequently Asked Ground Beef Questions," EXCEL®—Cargill Foods Company, 1 pg., known to applicants at least by Oct. 2006.

"Ground Beef Color Guide—Color Matters!," EXCEL®, 1 pg., known to applicants at least by Oct. 2006.

"Ground Beef Patty Cooked Color Guide," Cargill Meat Solutions, Nov. 2004, 3 pgs.

International Search Report for PCT/US2005/020570 mailed Sep. 21, 2006 (3 pages).

"Application for Assessment of the Food Additive Carbon Monoxide (CO) Prior to Its Authorization." Norwegian Food Control Authority. 16 pages.

"Microbiological Safety of Controlled and Modified Atmosphere Packaging of Fresh and Fresh-Cut Produce." U.S. Food and Drug Administration: Center for Food Safety and Applied Nutrition. Sep. 30, 2001. 46 pages.

"Norwegian Application for Low Percentage Usage of CO in Modified Atmosphere Pakaging (MAP) for Fresh Meat—International Lobbying." Jul. 5, 2002.

"Notification of Claim for General Recognition of Safety of Carbon Monoxide in a Modified Atmosphere System for Packaging Fresh Meat." Pactiv Corporation. 55 pages. Aug. 29, 2001.

"Postharvest Handling Systems: minimally processed fruits and vegetables." University of California: Cooperative Extension. <url: http://vric.ucdavis.edu/selectnewtopic.minproc.htm>. Jun. 11, 2002.

Eckert, LA et al, "Sensory, Microbial and Chemical Characteristics of Fresh Aerobically Stored Ground Beef Containing Sodium Lactate and Sodium Propionate." Institute of Food Technologists. Abstract only. 1 page.

Fontes, P.R. et al. "Color evaluation of carbon monoxide treated porcine blood." Meat Science 68, pp. 507-513. Mar. 23, 2004.

Hoithaus, Tony. "Published Headspace Recommendations." 1 page.

International Search Report and Written Opinion, PCT/US06/025879, Mailed on Dec. 18, 2006, Applicant: Cargill, Incorporated, 12 pages.

Jayasingh, P. et al. "46G-17 Sensory evaluation of ground beef stored in high-oxygen modified atmosphere packaging" 2002 Annual Meeting and Food Expo. 1 page.

Jayasingh, P. et al. "Evaluation of Carbon Monoxide (CO) Treatment in Modified Atmosphere (MAP) or Vacuum Packaging (VP) to Increase Color Stability of Fresh Beef." Amerioan Meat Science Association. Page 132. Date :NA.

Jayasingh, P. et al. "Evaluation of carbon monoxide treatment in modified atmosphere packaging or vacuum packaging to Increase color stability of fresh beef." Meat Science. Mar. 9, 2001.

John, L. et at. "76F-20 Comparison of visual color, instrumental color and myoglobin denaturation of cooked ground beef stored in modified atmospheres of 80% oxygen or 0.4% carbon monoxide." 2003 IFT Annual Meeting. 1 page.

John, L. et al. "78F-21 Comparison of color and thiobarbituric acid (TBA) values of cooked beef top sirloin steaks stored in modified atmospheres of 80% oxygen or 0.4% carbon monoxide." 2003 IFT Annual Meeting, 1 page.

John, L. et al. "Comparison of Color and Thiobarbituric Acid Values of Cooked Hamburger Patties after Storage of Fresh Beef Chubs in Modified Atmospheres." Journal of Food Science. vol. 69, Nr. 8, 2004.

John, L. et al. "Color and thiobarbituric acid values of cooked top sirloin steaks packaged in modified atmospheres of 80% oxygen, or 0.4% carbon monoxide, or vacuum." Meat Science. Aug. 27, 2004.

Kader, A.A. "Physiological and Biochemical Effects of Carbon Monoxide Added to Controlled Atmospheres on Fruits."ISHS Acta Horticulturee 138: Postharvest Physiology and Storage, XXI IHC. Abstract only. 1 page.

Kahl, L.S. "Agency Response Letter GRAS Notice No. GRN 000005." FDA: Center for Food Safety and Applied Nutrtion. Dec. 11, 1998. 2 pages. <URL: http://www.cfsan.fda.gov/~rdb/opa-g005.htm>.

Kaneko, J. "The use of carbon monoxide in fish processing: Commercial concerns." PacMar, Inc. 1 page.

Krogvig, a. et al. "Supplementary information in support of Norwegian application for low percentage usage of CO in Modified Atmosphere Packaging (MAP) system for fresh meat," Norwegian Meat Cooperative and Norwegian Independent Meat Association. Jul. 5, 2002.

Luño, M. et al. "Beef shelf life in low O2 and high CO2 atmospheres containing different low CO concentrations." Meat Science 55, pp. 413-419. 2000.

Luño, M. et al. "Shelf-life Extension and Colour Stabilisation of Beef Packaged in a Low O2 Atmosphere Containing CO: Loin Steaks and Ground Meat." Meat Science, vol. 48, No. 1/2, pp. 75-84. 1998.

Maca, J.V. et al. "Microbiological, Sensory and Chemical Characteristics of Vacuum-Packaged Cooked Beef Top Rounds Treated with Sodium Lactate and Sodium Propionate." Institute of Food Technologists. Abstract only. 1 page.

Maca, J.V. et al. "Microbiological, Sensory and Chemical Characteristics of Vacuum-Packaged Ground Beef Patties Treated with Salts of Organic Acids." Institute of Food Technologists. Abstract only. 1 page.

Mattia, A. "Agency Response Letter GRAS Notice No. GRN 000166." FDA: Center for Food Safety and Applied Nutrition. Oct. 12, 2005. 2 pages <URL: http://www.cfsan.fda.gov/~rdb/opa-g166.html>.

Morgan, J. Brad. "Extending Shelf-Life of Beef Cuts Utilizing Low Level Carbon Monoxide in Modified Atmosphere Packaging Systems: Project Summary". Jul. 2003. National Cattlemen's Beef Association Center for Research & Knowledge Management.

Nissen, H. et al. "Comparison between the growth of Yersinia enterocolitica, Listeria monocytogenes, *Escherichia coli* 0 157:H7 and Salmonella spp. In ground beef packed by three commercially used packaging techniques." International Journal of Food Microbiology. Jun. 5, 2000.

Nissen, H. et al. "Packaging of Ground Beef in an Atmosphere with Low Carbon Monoxide and High Carbon Dioxide Restrains Growth of *Escherirchia coli* 0157:H7, Listeria Monocytogenes, Yersinia Enterocolitica and Salmonella Diarizonae." Edited by Tuljtefaars, A.C.J. et al. *Food Microbiology and Food Safety Into the Next Millenium*, Proceedings of the Seventeenth International Conference of the International Committee on Food Microbiology and Hygiene (ICFMH). pp. 285-286. Sep. 1999.

Oliver, J.F. "Agency Response Letter GRAS Notice No. GRN 000015." FDA: Center for Food Safety and Applied Nutrition. Mar. 10, 2000, 3 page. <URL: http://www.cfsan.fda.gov/~rdb/opa-g015.html>.

Otwell, W, Steven et at. "L5. Use of Carbon Monoxide for Color Retention in Fish." First Joint Trans-Atlantic Fisheries Technology Conference. 2003.

Rulis, Alan M. "Agency Response Letter GRAS Notice No. GRN 000083." FDA. Center for Food Safety and Applied Nutrition. Feb. 12, 2002. 3 pages <URL: http//vww.cfsan.fda.gov/~rdb/opa-8083.html>.

Scientific Committee on Food, "Opinion of the Scientific Committee on Food on the use of carbon monoxide as component of packaging gases in modified atmosphere packaging for fresh meat." European Commission: Health 8 Consumer Protection Directorate-General. Dec. 18, 2001.

Solheim, R. "Consumer Purchase Probability of Beef and Pork Packaged in Different Atmospheres." Summary in English.

Sørhelm, O, et al. "Color stabilization of pork chops packaged with a low level of carbon monoxide." 51st Annual Recjprocal Meat Conference, Jul. 1998.

Sørhelm, O. "Discoloration of Meat as an Indicator of Leakages in Packages Containing a CO Gas Mixture." Abstract in English, Nov. 28, 1996.

Sørheim, O. "Prospects for Utilization of Carbon Monoxide in the Muscle Food Industry." Edited by W. Steven Otwell et al. *Modified Atmospheric Processina and Packaging of Fish: Filtered Smokes, Carbon Monoxide,and Reduced Oxygen Packaging*. pp. 103-115.

Tarantino, Laura M. "Agency Response Letter GRAS Notice No. GRN 000143." FDA: Center for Food Safety and Applied Nutrition. Jul. 29, 2004. 3 pages. <URL: http://www.cfsan.fda.gov/~rdb/opa-g143.html>.

Tarantino, Laura M. "Agency Response Letter GRAS Notice No. GRN 000167." FDA: Center for Food Safety and Applied Nutrition. Sep. 29, 2005. 3 pages. <URL: http://wiffik.cfsan.fda.gov/~rdb/opa-g167.html.

Truong, Van-Den. "Lettuce and Tomato." 2 pages. Accessed Dec. 28, 2004.

Yndestad, Magne. "The Use of CO as a Packaging Gas for Fresh Meat." 9 pages.

Yoshida, Masaharu et al. "Effect of Carbon Monoxide on Colour Difference and K values in Fresh Fish Muscle." Jpn. J. Food Chem, vol. 5(1), 1998. Abstract only. 1 page.

Krause, T.R., et, "Use of Carbon Monoxide Packaging for Improving the Shelf Life of Pork," Journal of Food Science, 2003, pp. 2596-2603, vol. 68, No. 8, Institute of Food Technologists.

Sørheim, O., et al., "Carbon Monoxide as a Substitute for Nitrite in Meat Batter Systems," 50th International Congress of Meat Science and Technology, Helsinki, Finland, 4 pages, ICoMST 2004.

Sørheim, O., et al., "Carbon Monoxide in Meat Packaging," Business Briefing Foodtech, Jun. 2002, pp. 1-4.

Sørheim, O., et al., "Effects of Carbon Dioxide on Yield, Texture and Microstructure of Cooked Ground Beef," Meat Science (in Press), 5 pages.

Sørheim, O., et al., "Effects of High $CO_2$ /Low CO Atmosphere on Colour and Yield of Cooked Ground Beef Patties," 47th ICoMST, Aug. 26-31, 2001, pp. 196-197, vol. II, Krakow, Poland.

Sørheim, O., et al., "Influence of Beef Carcass Stretching and Chilling Rate on Tenderness of M. Longissimus Dorsi," Meat Science, 2001, pp. 79-85, vol. 57, Elsevier Science.

Sørheim, O., et al., "Muscle Stretching Techniques for Improving Meat Tenderness," Trends in Food Science & Technology, 2002, pp. 127-135, vol. 13, Elsevier Science.

Sørheim, O., et al., "Packaging of Red Meats with Carbon Monoxide Atmospheres," Matforsk-Norwegian Food Research Institute, Jun. 16, 2004, 8 pages, Norway.

Sørheim, O., et al., "Shelf Life of Chicken Fillets with Cheese Sauce Stored in a Low CO/High $CO_2$ Atmosphere," 48th ICoMST—Rome, Aug. 25-30, 2002, pp. 784-785.

Sørheim, O., et al "Technological, Hygienic and Toxicological Aspects of Carbon Monoxide used in Modified-atmosphere Packaging of Meat," Trends in Food Science & Techthology, 1997, pp. 307-312(6), vol. 8, No. 9, Elsevier Science.

Sørheim, O., et al., "The Storage Life of Beef and Pork Packaged in an Atmosphere with Low Carbon Monoxide and High Carbon Dioxide," Meat Science, 1999, pp. 157-164, vol. 52, No. 2, Elsevier Science.

Sørheim, O., et al., "Use of Carbon Monoxide in Retail Meat Packaging," Hot Topics in Meat Processing, Proceedings of the 54th Reciprocal Meat Conference, 2001, p. 47-51, American Meat Science Association.

Tørngren, M. A., et al. "Effect of Packing Method on Colour and Eating Quality of Beef Loin Steaks," 49th International Congress of Meat Science and Technology, 2nd Brazilian Congress of Meat Science and Technology, pp. 495-496, ICoMST 2003.

Watts, D. et al, "Fate of [$^{14}$C] Carbon Monoxide in Cocked or Stored Ground Beef Samples," J. Agric. Food Chem., 1978, pp. 210-214, vol. 26, No. 1.

Zhao, Y. et al., "Dynamic Changes of Headspace Gases in $CO_2$ and $N_2$ Packaged Fresh Beef," Journal of Food Science, 1995, pp. 571-591, vol. 60, No, 3.

Clark, D.S. et al., "Use of Carbon Monoxide for Extending Shelf-life of Prepackaged Fresh Beef," Canadian Institute of Food Science and Technology Journal, 1976, pp. 114-117, vol. 9, No. 3.

FDA, "Release-Carbon Monoxide in Fresh Meat," FDA Petition and Press Release, Nov. 15, 2005, 320 pages.

Gill, C.O., "Extending the Storage Life of Raw Chilled Meats," Meat Science, 1996, Supplement pp. 99-109, vol. 43, Elsevier Science.

Hunt, M.C. et al., "Color and Heat Denaturation of Myoglobin Forms in Ground Beef," Journal of Food Science, 1999, vol. 64, No. 5, pp. 847-851.

Jayasingh, P. et al., "Sensory Evaluation of Ground Beef Stored in High-oxygen Modified Atmosphere Packaging," Journal of Food Science, 2002, vol. 67, No. 9, pp. 3493-3496.

\* cited by examiner

MEAT PROCESSING

REFERENCE TO RELATED APPLICATIONS

This application claims priority to U.S. Provisional Application Ser. No. 60/695,904 filed on Jul. 1, 2005 and PCT Application No. PCT/US2006/025879 filed on Jun. 30, 2006, each of which is incorporated herein by reference.

FIELD OF THE INVENTION

The present invention relates to meat processing. More particularly, the present invention relates to a method for utilizing carbon monoxide as a process aid in cooking systems to assist in retaining a pleasing raw meat color.

BACKGROUND OF THE INVENTION

A major factor in the color of many meat products is myoglobin. Myoglobin helps to transport oxygen throughout the muscle cell to produce energy. The quantity and the type of myoglobin in the meat determines the relative shade of the meat. The initial myoglobin quantity and type varies by animal age as well as physical activity of the muscle. The three major forms of myoglobin in ground beef are oxymyoglobin (myoglobin bound to oxygen, $MbFe(II)O_2$), deoxymyoglobin (myoglobin bound to water) and metmyoglobin (oxidized myoglobin, $MbFe(III)$).

Fresh ground beef is normally associated with a red color. The red color is due to the myoglobin being predominantly in the form of oxymyoglobin. When ground beef gets older or is cooked the color changes to brown due to the oxidization and/or denaturation of the ground beef, turning the myoglobin to metmyoglobin. Metmyoglobin is the most stable natural state. Over time the ability of the myoglobin to absorb oxygen or water, and revert to oxymyoglobin, is reduced. After time, the myoglobin therefore remains predominantly in the metmyoglobin state. Beef and other products may also turn a brownish color when cooked because of the oxidation and denaturation of the myoglobin by heat. The brown color due to the metmyoglobin is not associated with fresh or desirable ground beef by the consumer. When ground beef is vacuum packaged it has more of a purplish color due to the myoglobin being predominantly present as deoxymyoglobin.

Finely textured beef (FTB), also referred to as fat reduced beef, is a lean edible by-product derived primarily from fatty beef trimmings. The raw material for FTB includes trimmings derived from boning and fabrication operations of a beef carcass. The raw material can be high in fat but contains visible lean meat. FTB is formed when the lean meat is separated through a rendering process to achieve a relatively low-fat lean meat product. Rendering is the heating of meat products to separate out the meat from the fat. Production of FTB changes the original trimmings from a fatty, low quality, low value product to a relatively lean and valuable product.

FTB is used in the meat industry as an ingredient in ground beef, raw hamburger patties, and frozen meat such as frozen hamburger patties. While FTB can help to reduce raw material costs for processors, it may be functionally inferior because the processing method to produce FTB can have a detrimental impact on color. During the processing of FTB the meat is rendered to remove the fatty material. The heating of the FTB during manufacturing can turn the meat a brownish color. The brownish color of the FTB may limit the amount of material that can be added to ground beef products that are being sold directly to consumers. There is therefore a need in the art for a method of retaining and improving the red color of meat during processing of meat trimmings to make FTB.

BRIEF SUMMARY OF THE INVENTION

The present invention includes exposing meat and meat byproducts to carbon monoxide gas during a rendering process to produce a finely textured beef with an improved color.

The present invention includes a method of exposing meat and meat by-products to carbon monoxide gas during cooking to preserve the raw, fresh-meat color desired by the consumer.

The present invention further includes a method and apparatus for exposing meat derived from fat trimmings to carbon monoxide during the process by which the excess fat is removed.

The present invention also includes a method for rendering meat trimmings including heating the meat trimmings to liquefy a fat portion of the meat trimmings, exposing the meat trimmings during heating to a treatment gas containing a desired amount of carbon monoxide, and separating the meat trimmings from the liquefied fat.

The present invention further includes making finely textured beef from meat trimmings by grinding meat trimmings into a desired size, heating the meat trimmings to liquefy the fat, separating the meat trimmings from the liquefied fat, packaging the meat trimmings, and exposing the meat trimmings (FTB) to carbon monoxide during one or more of the grinding, rendering, and separating steps.

The present invention further includes a method for improving the desirability of a heated meat product by exposing the meat to carbon monoxide during heating.

While multiple embodiments are disclosed, still other embodiments of the present invention will become apparent to those skilled in the art from the following detailed description, which shows and describes illustrative embodiments of the invention. The present invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
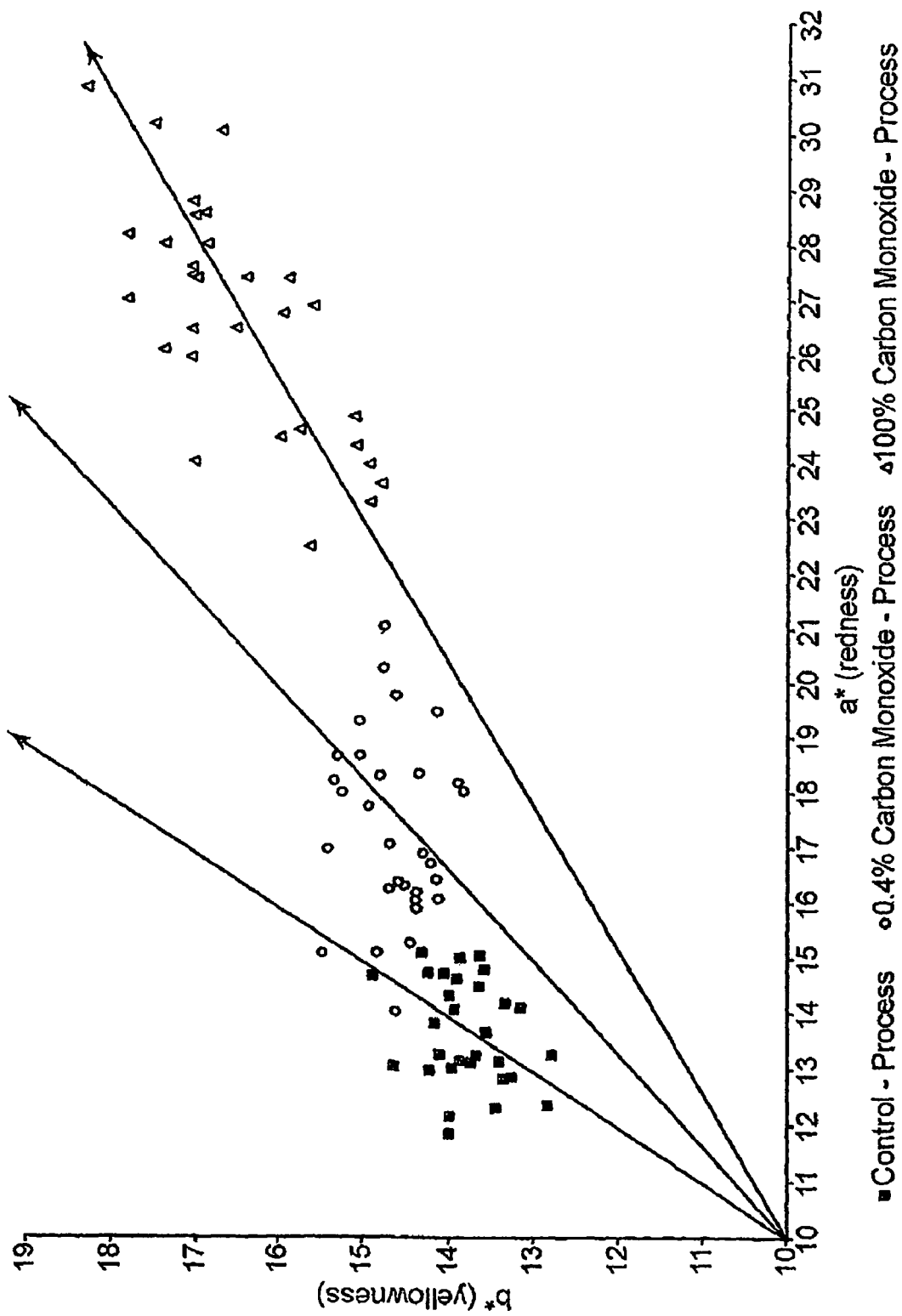
FIG. 1 illustrates a graph showing the hue of finely textured beef rendered under different treatment gases containing different levels of carbon monoxide.

The present invention includes a method for using carbon monoxide (CO) as a process aid to ameliorate the loss of the red color in fatty meat trimmings during rendering. The present description is put forth in terms of processing fatty beef trimmings, having a fat content between about 20% and about 88% by weight, into FTB. FTB may also be referred to in this disclosure as fat reduced beef (FRB). The FTB is produced by a low temperature rendering process of fatty beef trimmings. One target FTB may be, for example, 95% chemical lean with +/−1% upper and lower control limits.

The source of the meat trimmings can be from steer, heifer, or more mature carcasses and may include trimmings free of blood clots and discoloration. The initial meat or meat by-product can include beef trimmings that are greater than 50% fat. Various beef by-product materials may also be present in the raw beef material. Undesirable materials, such as heavy connective tissue, bone, bone chips, cartilage, tendons back strap, or other materials may be excluded to produce an improved final product.

The present invention, however, is not limited to use with beef and beef trimmings. This present invention may be incorporated for processing other meats and producing other types of meat products, including, for example, pork, lamb, poultry (e.g., chicken, turkey, etc.), and fish. In addition, the present invention may further be used while cooking specific meat products, such as, for example, roast beef, bacon, or brisket, where it is desirable for the cooked meat product to have a more "rare" or red color.

Beef with a brown color is associated with cooked or old meat and is undesirable to the consumer. Because of the detrimental impact on color resulting from current processes for producing FTB from meat and meat byproducts, only about 10-15% by weight of FTB can be incorporated into most fresh ground beef and still produce a product that is pleasing to the consumer's eye. The present invention allows FTB to be produced with a more pleasing color and thus allows for a greater amount of FTB to be added to ground beef and other meat products. The FTB can be added to the ground beef products at levels of up to 25% or more when an improved color is achieved through the use of the present invention method.

In other embodiments the FTB may be incorporated into products up to about 30, 35, 40, 45%, or 50% or more.

The present invention allows for the conversion of myoglobin in the meat trimmings to carboxymyoglobin. Carboxymyoglobin is a bright pink-red and is extremely stable, retaining its red color for a long period of time. Moreover, carboxymyoglobin possesses a slightly elevated denaturation temperature and is more resistive to oxidation. Carboxymyoglobin will therefore not loose its bright pink-color as easy during thermal processes and can allow for a longer storage life of the meat in a form and color that is pleasing to the consumer.

The present invention contemplates using a gas containing about 0.01% or more carbon monoxide during the rendering or cooking of a meat product. Further embodiments may contain up to about 0.4% carbon monoxide. Still further embodiments may contain about 0.4% to about 10% carbon monoxide. Further embodiments may contain about 1-5%, 10-20%, 20-30%, 30-40%, 40-50%, around 50%, or greater than 50% carbon monoxide. Still further embodiments may include approximately 100% carbon monoxide in the atmosphere. The various atmosphere compositions containing CO utilized herein will be referred to collectively as the "treatment gas" or "gas treatment." Other gases may be present with the CO such as, but not including, various amounts of carbon dioxide, nitrogen, or other gases.

The pressure of the treatment gas can be normal or elevated. As may be appreciated, when the pressure is elevated the meat is exposed to a greater amount of CO treatment gas without increasing the volume percentage of CO in the treatment gas. Introducing the CO at an elevated atmospheric pressure can therefore accelerate or improve the incorporation of the CO into the myoglobin and further improve the color of the final product. The CO utilized herein is a food grade bulk CO that is provided in tanks but can be provided in any manner without changing the nature and scope of the present invention.

The present invention may expose the meat trimmings at a point before the myoglobin proteins are denatured by cooking, allowing for a more complete binding of the CO to the myoglobin. Moreover, exposure during the actual rendering process may further aid in a more complete conversion of the myoglobin to carboxymyoglobin. Before the fat is melted during rendering it is difficult to insure complete exposure of the CO to the muscle as pockets of the treatment gas may form in the fat tissue, thus preventing full exposure of all of the meat trimmings to the treatment gas. When the fat is melted during rendering it may be easier to insure full exposure of the meat trimmings. Finally, retailers mixing the finished lean meat product with commercial products, such as ground beef being sold to consumers, can produce a finished product with an improved color by incorporating the improved FTB product.

Rendering involves cooking and separating meat trimmings into useful commodities such as edible (fit for human consumption) and inedible (not suitable for human consumption) animal derivatives. Edible rendering facilities process fatty animal tissue into edible fats and proteins. The inedible rendering plants produce tallow and grease, which may be used in livestock and poultry feed, soap and the production of fatty acids.

Color is in general measured using three different values, hue, lightness and saturation. Hue is the actual "color" of the material, i.e., red or green. Lightness is a measure of the brightness of the color and saturation is a measure of the vividness. The hue of ground beef can be quantified by using numerical references relating to $a^*$ (redness) and $b^*$ (yellowness). Redness values that are positive indicate a red color and redness values that are negative indicate a green color. Positive yellowness numbers indicate a yellow color and negative yellowness values indicate a blue color. Lightness is reported as $L^*$ on a 0 to 100 scale with 0 being black and 100 being pure white. A calorimeter may obtain results for the $a^*$, $b^*$, and $L^*$ values. The hue and saturation can then be calculated using these values. A desirable FTB product can have an $a^*$ value of about 30 or above. In further embodiments the $a^*$ value may be approximately 10-15, approximately 20, or approximately 25 or above. A desirable $a^*$ value for ground beef can be as high as about 25, 30 or higher depending on the type of product.

As used in this description, "pleasing color" implies that the color of the meat catches the eye of the consumer as a fresh and desirable meat product, by, for example, stimulating the consumer's appetite.

Example 1

Fatty beef trimmings were first obtained from a commercial facility and ground three times using a Tor-Rey M12-FS meat grinder (Tor-Rey USA Inc., Houston, Tex.) equipped with a ⅛ inch plate. The ground meat was then divided into three different lots weighing approximately 272 grams each. Each lot was then placed in a separate Pyrex 250 mL Erlenmeyer glass flask. A normal atmosphere was trapped in the first flask using a rubber stopper. A treatment gas containing 0.4% CO was added to the second flask and sealed with a stopper and a treatment gas containing 100% CO was added to the third flask and sealed with a stopper. The treatment gas in the flask containing 0.4% CO also contained 35% carbon dioxide and 64.6% nitrogen. The gas mixtures were obtained from Airgas-Mid South, Inc. (Tulsa, Okla.).

Each of the lots was rendered at 110° F. for 20 minutes in a constant temperature water bath. The rendering time was appropriate for a low temperature rendering process used to liquefy fat in meat trimmings.

The rendered meat trimmings were then centrifuged in an IECC-6000 centrifuge (International Equipment Company, Neeham, Mass.) in 50 mL plastic centrifuge tubes (Fisher Scientific, Pittsburgh, Pa.). After the liquefied fat and lean meat trimmings (now FTB) were separated, lightness, a*, and b* measurements were taken of the FTB using a Minolta Chromameter CR-400 colorimeter (Konica Minolta U.S.A. Inc., Mahwah, N.J.). Hue and saturation were later calculated from this data. The described experiment was run 30 times to collect a statistically significant data set.

Table 1 below shows the descriptive statistics, by treatment, for color attributes of finely textured beef when using carbon monoxide as a process aid during the rendering process. Table 2 presents other data, including least squares means, by treatment, for the effect of carbon monoxide treatment on color attributes during the rendering process.

TABLE 1

| Color Attributes[a] per Treatment | n | Mean | SD | Minimum | Maximum |
|---|---|---|---|---|---|
| Control - Process: | | | | | |
| L* | 30 | 52.57 | 1.58 | 49.01 | 55.57 |
| a* | 30 | 13.67 | 0.95 | 11.85 | 15.10 |
| b* | 30 | 13.77 | 0.47 | 12.77 | 14.85 |
| a*/b* Ratio | 30 | 0.99 | 0.07 | 0.85 | 1.10 |
| Saturation[b] | 30 | 19.51 | 0.99 | 17.81 | 22.46 |
| Hue angle[c] | 30 | 45.01 | 2.08 | 40.62 | 49.71 |
| 0.4% Carbon Monoxide - Process: | | | | | |
| L* | 30 | 53.84 | 2.13 | 49.30 | 58.77 |
| a* | 30 | 17.39 | 1.68 | 14.01 | 21.08 |
| b* | 30 | 14.62 | 0.44 | 13.80 | 15.46 |
| a*/b* Ratio | 30 | 1.19 | 0.12 | 0.96 | 1.43 |
| Saturation | 30 | 22.60 | 1.55 | 19.27 | 25.72 |
| Hue angle | 30 | 40.59 | 3.37 | 34.95 | 48.48 |
| 100% Carbon Monoxide - Process: | | | | | |
| L* | 30 | 54.53 | 1.70 | 49.78 | 57.28 |
| a* | 30 | 26.71 | 2.14 | 22.53 | 30.89 |
| b* | 30 | 16.49 | 0.96 | 14.78 | 18.27 |
| a*/b* Ratio | 30 | 1.62 | 0.08 | 1.42 | 1.81 |
| Saturation | 30 | 31.13 | 2.38 | 27.41 | 35.89 |
| Hue angle | 30 | 31.68 | 1.36 | 28.99 | 35.20 |

[a]The a*/b* Ratio values measure shifts from red to brown (higher value indicates a redder color, lower values indicates a browner color).
[b]Saturation is a measure of color intensity/vividness (higher values indicate a more vivid color, Saturation = $(a^{*2} + b^{*2})^{1/2}$).
[c]Hue Angle represents the change from the true red axis (a larger number indicates shift from red to yellow, Hue angle = $\tan^{-1}(b^*/a^*)$).

TABLE 2

| | Color Attributes | | | | | |
|---|---|---|---|---|---|---|
| Treatment | L* | a* | b* | a*/b* Ratio | Saturation | Hue Angle |
| Control | 52.57[b] | 13.67[c] | 13.77[c] | 0.99[c] | 19.51[c] | 45.01[a] |
| 0.4% CO | 53.84[a] | 17.39[b] | 14.62[b] | 1.19[b] | 22.60[b] | 40.59[b] |
| 100% CO | 54.53[a] | 26.71[a] | 16.49[a] | 1.62[a] | 31.13[a] | 31.68[c] |
| S.E.M.[d] | 0.333 | 0.304 | 0.122 | 0.017 | 0.317 | 0.441 |

[a,b,c]Within a column, least square means that do not have common superscript letters differ ($P < 0.05$).
[d]S.E.M.: standard error of the means.

The date shown in Tables 1-2 is illustrated further in FIGS. 1-7. As illustrated in FIG. 1, the data was plot pointed to show the redness versus the yellowness (a* vs. b*) for each test run. Best fit lines were then plotted for each group. The plot illustrates that FTB produced during exposure to a treatment gas containing CO was significantly more red and significantly more saturated ($P<0.05$) than the normal atmosphere treatment gas (no CO) rendered meat trimmings. In the case of using 100% CO treatment gas the redness after rendering was significantly increased as compared to both the 0.4% CO treatment gas and the control treatment gas ($P<0.05$).

The distance from the origin point (in this case, 10, 10) indicates the degree of saturation and therefore illustrates the increased vividness of the FTB produced under the CO treatment gas ($P<0.05$). The increased saturation is further illustrated in a bar chart shown in FIG. 6. The plot line for each treatment group represents, compared to the x-axis, the average hue angle of each treatment group. The hue angle is a reflection of how red or how yellow each particular point may be. As shown further by FIG. 7, the hue angle represented by the plot line for each treatment group decreases ($P<0.05$). The lower hue angle indicates a redder color and therefore a more pleasing color to the consumer. The increase of the redness is further illustrated in a bar chart in FIG. 3 and an increase in the yellowness is shown in a bar chart in FIG. 4.

Figure 5:
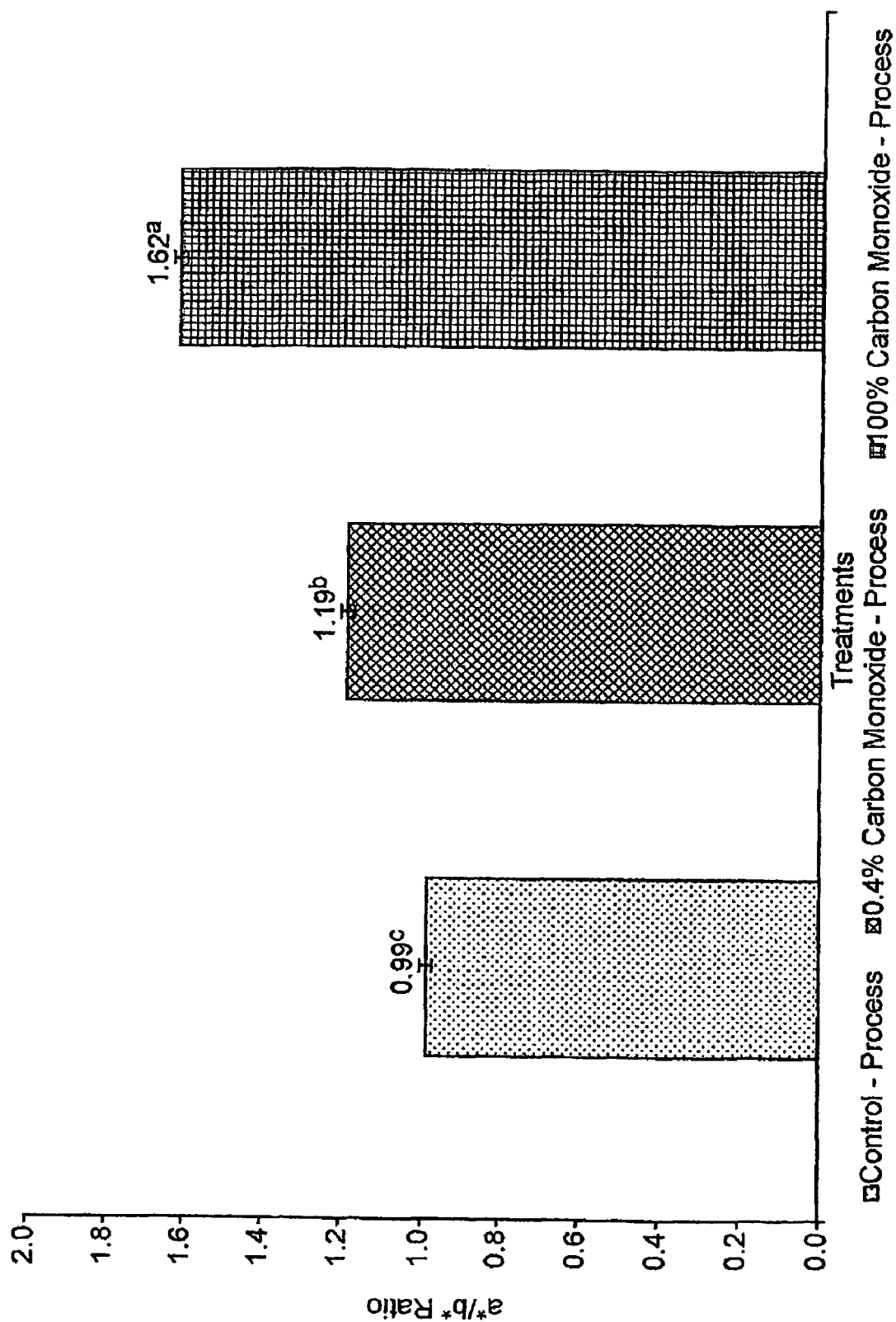
FIG. 5 is a chart showing the redness to yellowness ratio of finely textured beef rendered under different treatment gases containing different levels of carbon monoxide.
Figure 6:
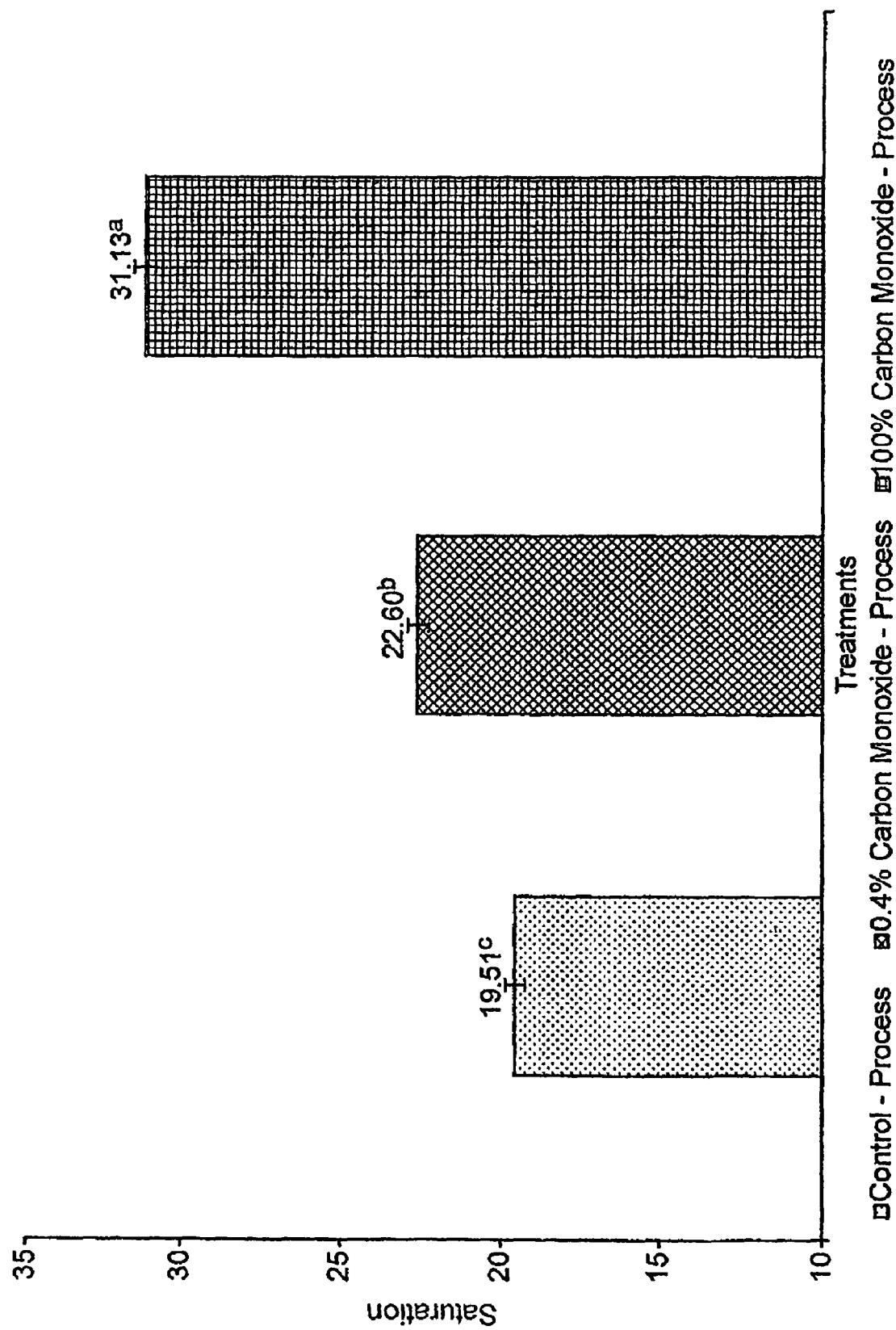
FIG. 6 is a chart showing the color saturation of finely textured beef rendered under different treatment gases containing different levels of carbon monoxide.
Figure 7:
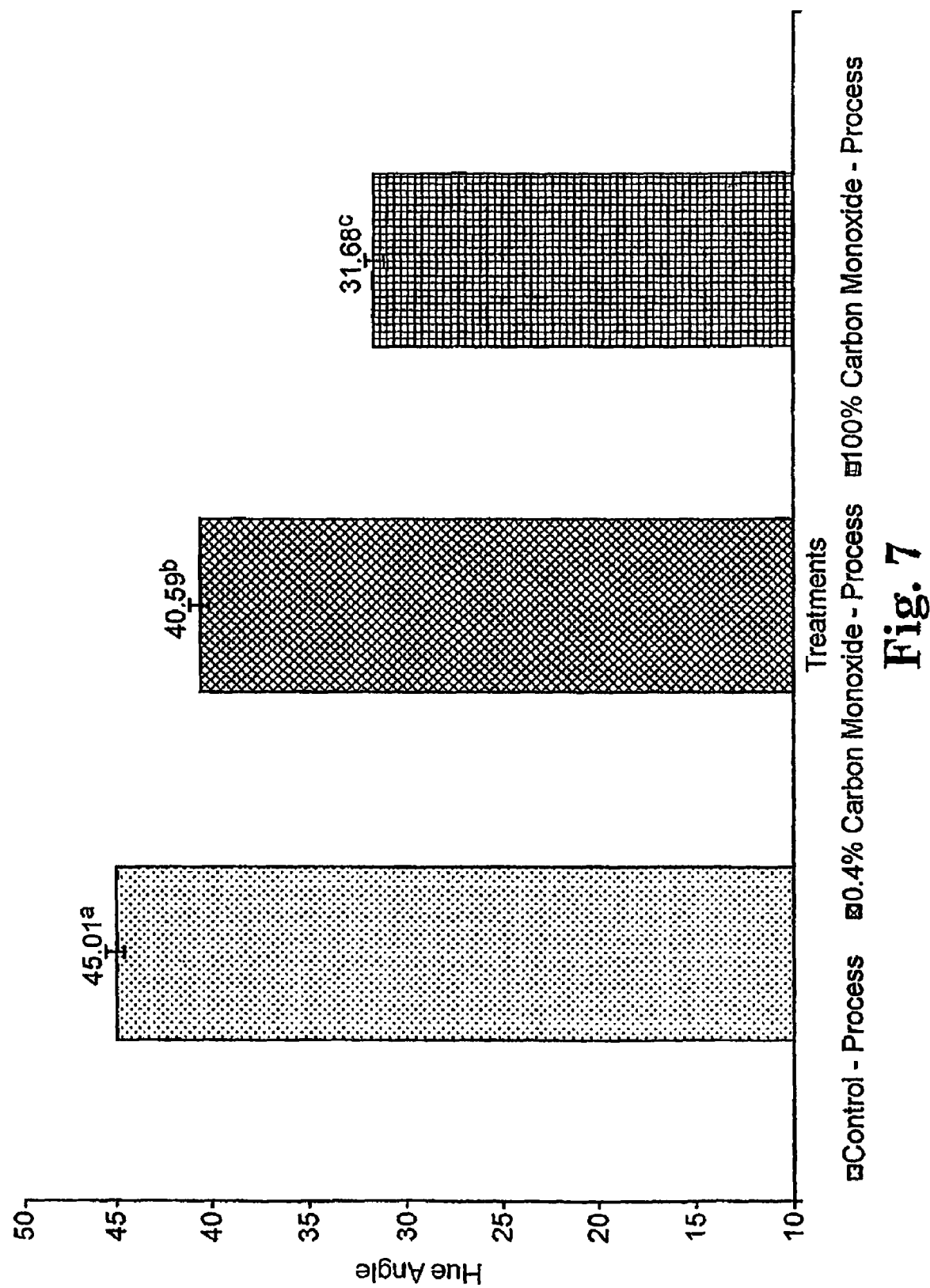
FIG. 7 is a chart showing the hue angle of finely textured beef rendered under different treatment gases containing different levels of carbon monoxide.

Another FTB product indicator is the ratio of redness to yellowness. A higher ratio results when the FTB appears redder in color. As illustrated in FIG. 5, the a*/b* ratio increased when the CO treatment gas was utilized during the rendering process and increased very significantly when the treatment gas contained 100% CO ($P<0.05$).

Figure 2:
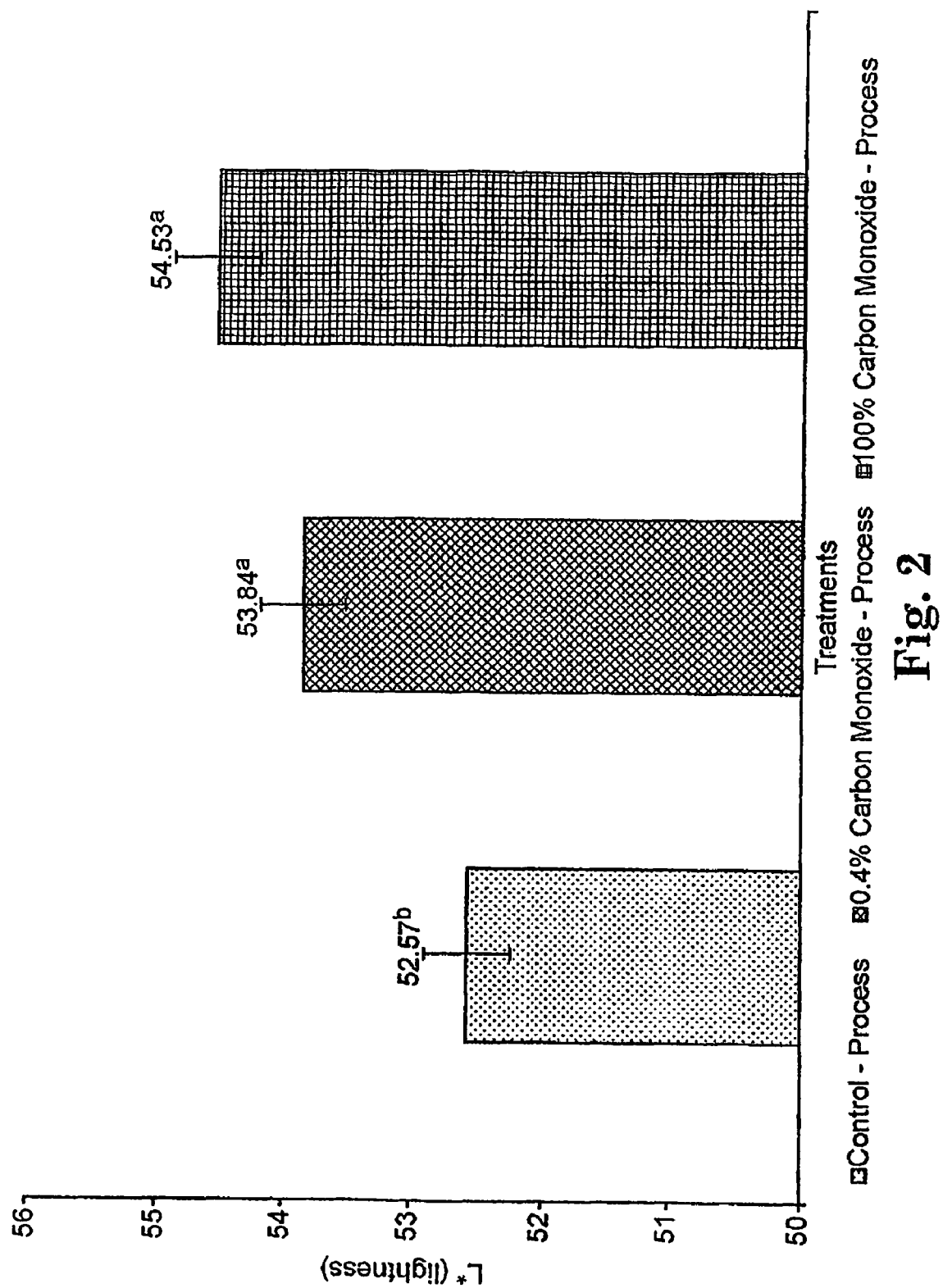
FIG. 2 is a chart illustrating the lightness of finely textured beef rendered under different treatment gases containing different levels of carbon monoxide.
Figure 3:
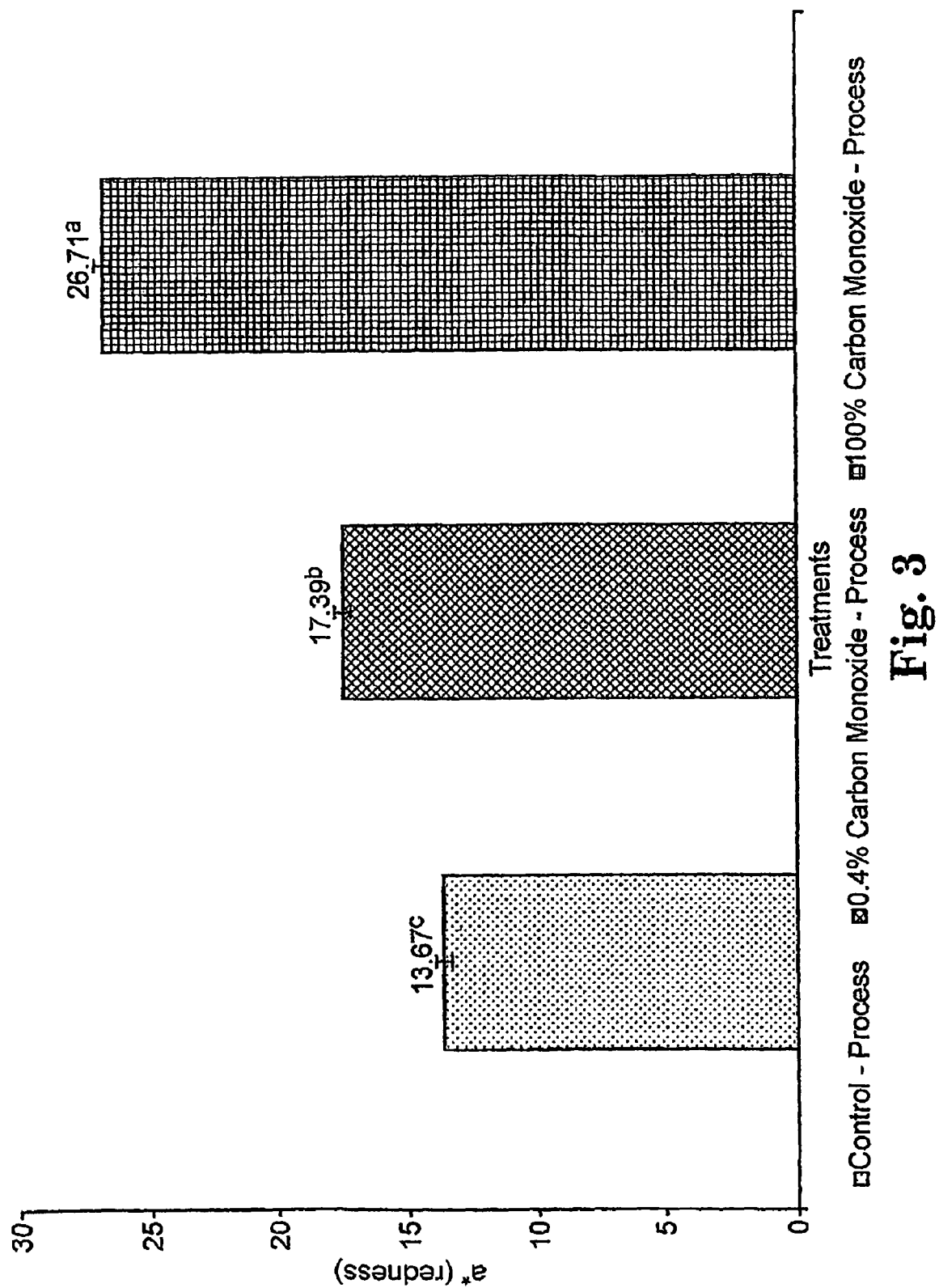
FIG. 3 is a chart illustrating the redness of finely textured beef rendered under different treatment gases containing different levels of carbon monoxide.
Figure 4:
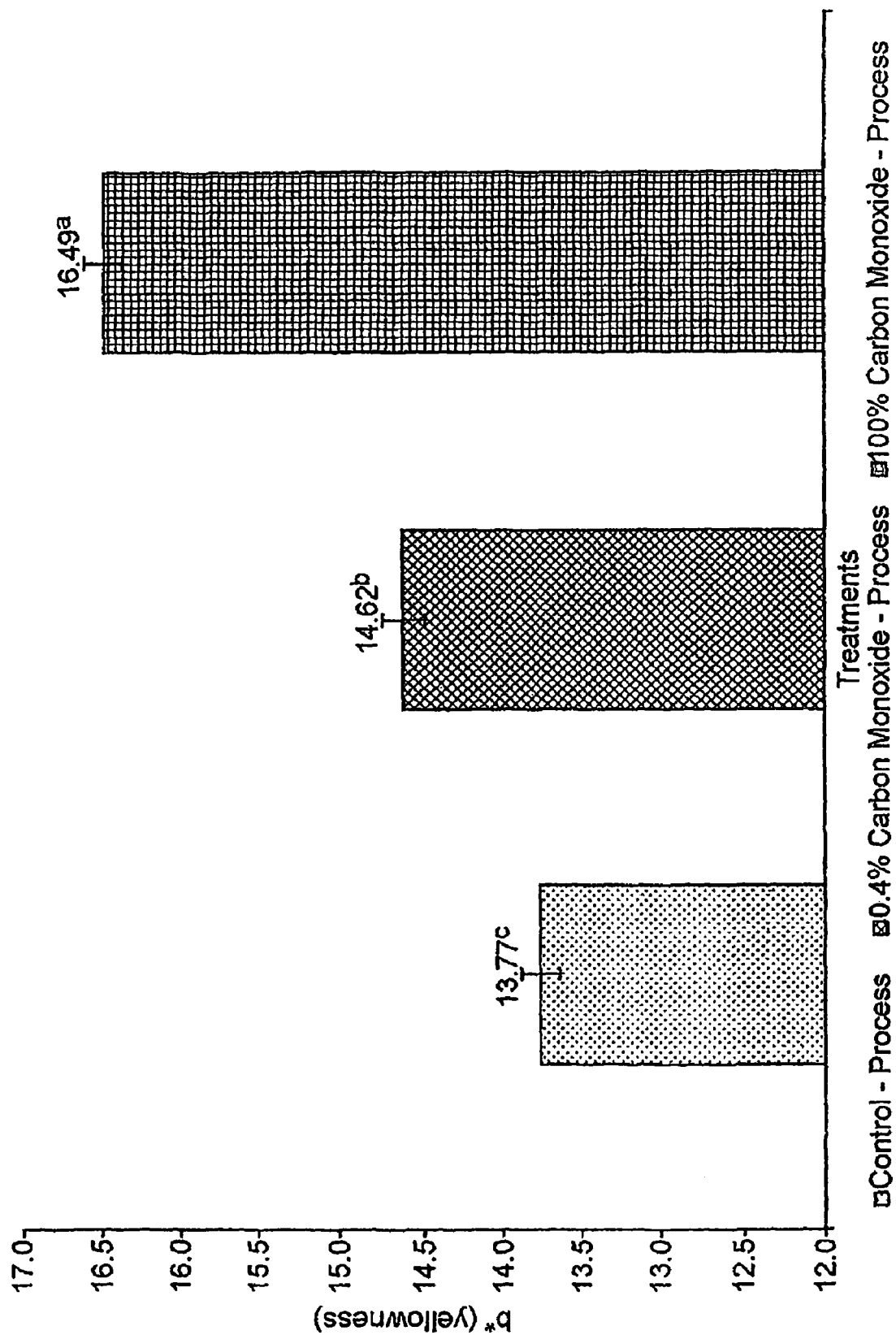
FIG. 4 is a chart illustrating the yellowness of finely textured beef rendered under different treatment gases containing different levels of carbon monoxide.

As illustrated in FIG. 2, the lightness of the FTB produced during the above experiment also increased as the CO percentage in the treatment gas increased ($P<0.05$). The increased lightness corresponds to an increased brightness of the FTB color. As illustrated, the FTB exposed to the treatment gas with increased CO showed a bright color.

Exposing the meat during the production process allows for more complete exposure to CO and for exposure before denaturation of the meat protein (myoglobin). Such early exposure may help to produce a product that retains a pleasing color longer when placed on grocery store shelves.

Figure 8:
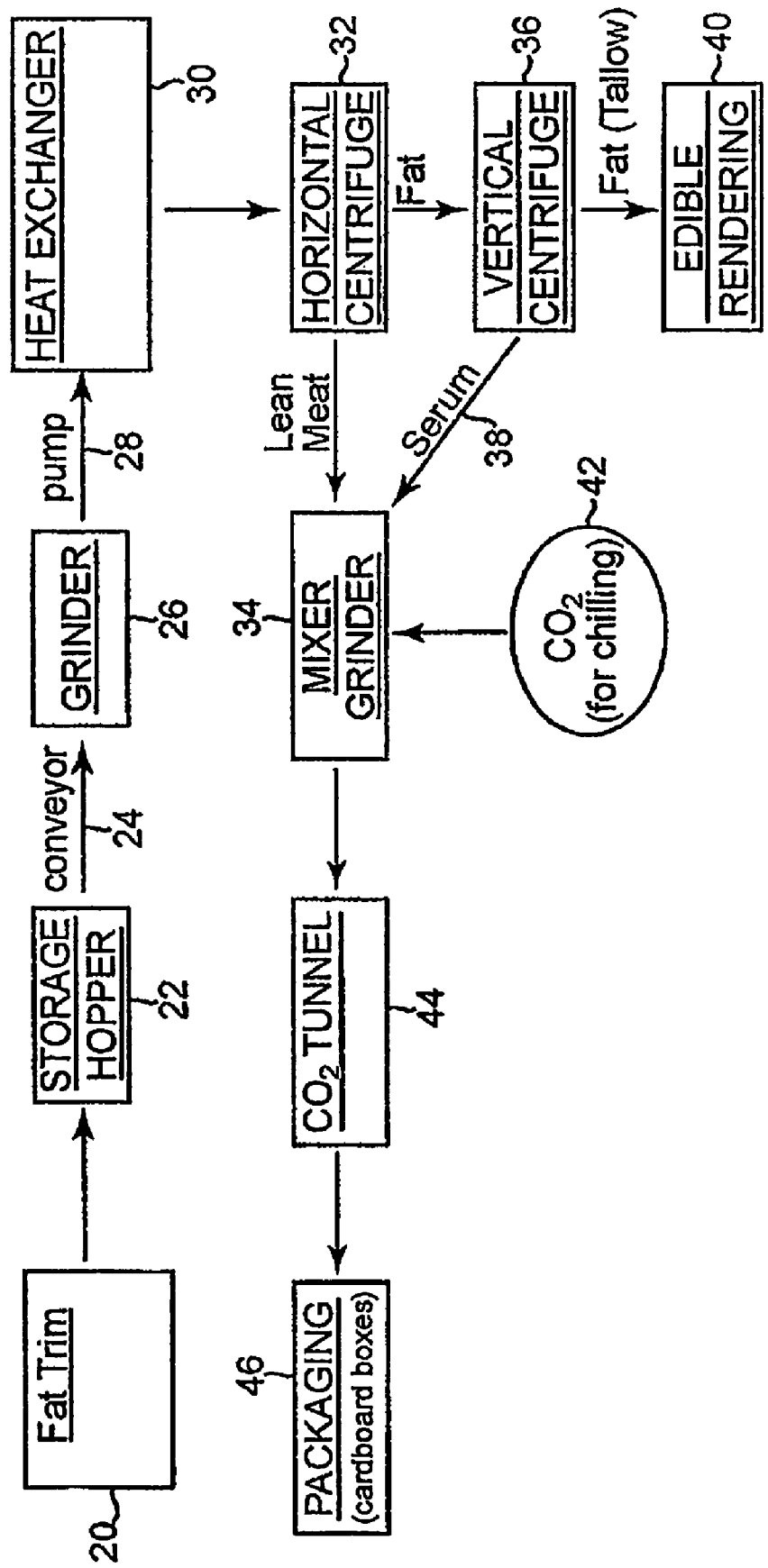
FIG. 8 is a flow chart showing alternative embodiment commercial embodiments of utilizing carbon monoxide in the production of finely textured beef.

FIG. 8 shows a method of producing FTB in a large scale factory setting utilizing CO treatment gas to achieve an improved color. The illustrated method for utilizing CO in a factory setting is only one embodiment. Various changes can be made to the specific embodiment reported without departing from the spirit and scope of the present invention.

The meat trimmings are first obtained from the slaughter and processing of the animal carcass. The size of the meat trimmings may vary depending on the source and may be up to or more than 88% fat.

The meat trimmings generated by the fabrication floor are maintained in a sanitary manner to prevent contamination and bacterial growth. The area in which the meat is obtained and in which following steps are carried out is normally kept at a constant 32° F. unless otherwise noted. In alternative embodiments, the temperature can be changed as desired.

The treatment gas contemplated for use in the present embodiment contains 0.4% CO. In further embodiments the level of CO in the treatment gas may be raised or lowered. In still further embodiments the treatment gas may include antimicrobial and other materials, such as ozone, that improves the food safety quality of the final product.

In a first optional step the meat trimmings may be processed (not shown) to remove undesirable meat products such as sinew and cartilage. Removal of the sinew and cartilage improves the overall quality of the finished FTB by improving the protein and texture qualities.

The meat trimmings are loaded into a stainless steel storage hopper 22 and then removed from the bottom of the hopper through a suitable pump to a conveyor 24. Alternatively, an auger may be used to remove meat product from the hopper to the conveyor. In either case, the pump or auger is operated at a rate sufficient to cause the desired amount of meat trimmings to be placed on the conveyer over a given period of time and transported to a grinder 26. The conveyor that transports the meat trimmings to the grinder in the present invention is a screw conveyor.

The grinder 26 may be any type or size grinder for reducing meat trimmings. In the present embodiment the grinder is equipped with a plate containing 5/32" diameter holes. Reducing the trimmings to a uniform size allows for a greater surface area to aid in heat penetration and fat extraction during the later rendering step. During the grinding process the meat trimmings may be exposed to CO by addition of the treatment gas to the grinder. In one embodiment the grinder is contained in a chamber that is substantially sealed so as to contain the treatment gas around the grinder. The treatment gas may be introduced by hoses, pumps, nozzles etc. Moreover, the conveyor may pass through an appropriate seal or other mechanism to reduce or stop the escape of the CO gas into the facility. In another embodiment the treatment gas with the CO may be passed over the meat trimmings as they pass through the grinder. In such a case the treatment gas can be collected utilizing a hood, vacuum, fans, pipes or other gas collection devices. In further embodiments, the CO may not be added until the actual rendering step.

Once the meat trimmings are ground the meat trimmings are pumped through a transfer pipe 28 that is approximately 2 inches in diameter. The transfer pipe transfers the meat trimmings to the rendering step.

In the present embodiment the ground meat trimmings are rendered by means of a continuous heat exchange process 30. This heat exchange process extracts and liquefies fat for separation from the lean meat solids. During rendering the temperature of the meat trimmings is raised to 105° F. gradually over a 15 to 20 minute period. Other temperatures and times may be utilized as desired. The present temperature can be conducive to denaturation of the meat proteins, causing the meat to turn gray or gray brown, and to contribute to microbial growth; precise control over the cooking parameters may therefore be maintained to produce the desired and consistent results.

In the present embodiment the meat trimmings reach a temperature of 105° F. just before or just at the time the meat trimmings reach the end of the heat exchange process. The amount of time that the meat spends at the temperature selected for the rendering can be adjusted as desired.

The present embodiment rendering process involves transporting the meat trimmings through a heat exchange pipe that is roughly 2 inches in diameter. A pump starts the meat trimmings flowing through the heat exchange pipe. A second pump approximately halfway through the heat exchange pipe may be utilized to continue the meat trimmings moving through the heat exchange pipe at the desired rate. Additional pumps may be further added as desired. Heated water in contact with the outside of the heat exchange pipe heats the meat trimmings passing through the heat exchange pipe at a desired rate. Heated water can be exposed to the outside of the heat exchange pipe by using a water jacketed pipe system. As may be appreciated, the flow of the meat trimmings can be monitored and controlled manually, mechanically, or by computer. In addition, the pipe may any desired length or width and may be heated in alternative ways.

At selected points along the heat exchange pipe the treatment gas is bubbled into the pipe under pressure. In order to bubble the treatment gas into the pipe the treatment gas must be at a higher pressure than that of the meat trimmings passing through the pipe. In the present embodiment the meat trimmings are at approximately 30 psi when passing through the heat exchange pipe. The treatment gas containing CO should therefore generally be at a higher pressure than 30 psi. The grinding of the meat trimmings before they are passed through the heat exchange pipe allows for easier, quicker, and more uniform heating of the meat trimmings. The grinding of the meat trimmings also allows for greater exposure of the meat trimmings to the treatment gas. The gas flow rate in this and other parts of the production process can be controlled by a computer and monitored by gas flow equipment using equipment known to those in the art.

In one embodiment the treatment gas is bubbled into the pipe at one or more points approximately one-quarter to one-half way through the heat exchange pipe. In other embodiments the specific point or points at which the treatment gas can be added can be optimized. Optimization may include determining the point at which the myoglobin begins to denature and/or oxidize and/or simply determining where along the heat exchange pipe the addition of the treatment gas results in the best colored FTB. The specific point for introducing the treatment gas may depend on the flow and heating rates. In any event, it may be preferred to introduce the treatment gas before the myoglobin can be denatured or oxidized by the heat process. As the meat trimmings are passed through the heat exchanger the meat trimmings become solid lean meat in a slurry with liquefied fat. Upon reaching the end of the heat exchange pipe, the slurry material is placed into a horizontal centrifuge 32. In other embodiments the gas may be added to the pipe or other heating apparatus in alternative ways.

One alternative embodiment may include a continuous direct steam cooking system, such as a RotaTherm® Direct Steam system, (Scan American Corporation, Kansas City, Mo.). In the RotaTherm® system meat is pumped through a vertical pipe that includes a number of steam injection ports. The steam is injected directly into the meat through injection ports to cook the meat. One or more of the injection ports may be converted for injection of the treatment gases or, in further embodiments, the treatment gas may be pre-mixed with the steam before it is injected into the pipe. An auger, propeller, or other device may also be situated in the pipe to keep the meat trimmings moving and to also prevent laminar flow. Preventing or reducing laminar flow may help to insure uniform cooking and treatment gas exposure. Once the meat is cooked it may be later centrifuged to remove the excess water introduced by the cooking process.

The horizontal centrifuge 32 separates the lean meat trimmings from the liquefied fat. The centrifuge utilized in the present embodiment is approximately 15 feet tall and 8 feet in diameter. The horizontal centrifuge separates out the lean meat trimmings which are, sent to a mixer grinder 34. The lean meat trimmings that are separated from the liquefied fat can now be referred to as FTB, lean meat trimmings, or still just referred to as meat trimmings with the understanding that the meat trimmings now exist as fat reduced meat trimmings, such as, in the present embodiment, fat reduced beef.

The liquefied fat that is separated from the lean meat during the horizontal centrifuge stage is transported to and placed in a vertical centrifuge 36. The vertical centrifuge further separates the fatty material into serum and fat tallow. Serum is a mixture of blood and other protein which is transported 38 to the mixer grinder for mixing with the previously separated lean meat. The pipe that transports the serum can be another 2 inch diameter pipe equipped with a pump and that may also include the application of CO. The remaining fat is tallow and can be used as edible rendering 40 or for other products, such as cosmetics.

The lean meat separated during the horizontal centrifuge stage is mixed with the serum obtained from the vertical centrifuge in a mixer and then passed to a grinder (collectively, 34). The mixer can operate by using a paddle, screw, auger, or any other mechanism known in the art. The mixed lean meat trimmings and serum can be removed from the mixer by a screw auger or other means and transported to the grinder. During the mixing and grinding stage carbon dioxide gas may be pumped 12 over the meat trimmings to further cool the material.

The grinder grinds the FTB into pellets or another desired size and shape. The pellets may be alternatively referred to as chunks, units, pieces, etc. As with the first grinder, the area around the grinder may be sealed in order to further expose the meat trimmings (which can be referred to as FTB anytime after meat trimmings are separated from the liquefied fat) to the treatment gas containing the CO. Additionally, the treatment gas may be passed over the meat trimmings before, during, or after they are ground. In the current embodiment the beef is extruded through a series of 1/8" diameter holes in the grinding plate to form the pellets.

The pellets formed by the mixer grinder are then loaded on an inline tunnel/drum 44 to freeze the pellets, again using carbon dioxide or other chilling means such as dry ice. The frozen pellets are then packaged 46 and sent to a freezer for storage. In further embodiments the FTB may not be stored as pellets but instead may be chipped or formed into other shapes and sizes for storage or immediate use, whether as frozen pellets or for immediate use.

In further embodiments, the CO treatment gas may be utilized during any of the phases of the FTB production. Such as, for example during the centrifuging of the meat trimmings and liquefied fat, during the transportation of the ground meat trimmings to the rendering step, or during the pellet packaging process.

The present embodiment has been described as a substantially continuous process. In other embodiments the CO treatment gas may be incorporated into a rendering operation for the production of FTB that is a batch process or combination continuous and batch process.

As discussed above, the present invention is described in utilizing CO during a low temperature rendering process. The CO can also be utilized in various steps of a high temperature meat cooking process. Such a process can heat the meat trimmings to temperatures or higher than 110° F., such as, for example, about 120° F.

Collected gas that contains CO may be vented out of the production facility and into the atmosphere. In other embodiments various filters, burners, or other treatment processes or cleaning steps may be utilized on the used treatment gas to reduce emissions.

Various modifications and additions can be made to the exemplary embodiments discussed without departing from the scope of the present invention. Accordingly, the scope of the present invention is intended to embrace all such alternatives, modifications, and variations as fall within the scope of the claims, together with all equivalents thereof.

The invention claimed is:

1. A method for producing lean meat from meat trimmings comprising:
   (a) heating the meat trimmings to a temperature of up to about 120 F to liquefy a fat portion of the meat trimmings to produce a liquefied fat;
   (b) exposing the meat trimmings during the heating step to a treatment gas containing between about 0.4% and about 50% of carbon monoxide by volume wherein carbon monoxide binds to the myoglobin in the meat product to reduce the effect of discoloration caused by heating; and
   (c) separating the meat trimmings from the liquefied fat, wherein separated meat trimmings from step (c) are suitable for use as a protein ingredient having a lowered fat content than the meat trimmings of step (a).

2. The method of claim 1 wherein heating the meat trimmings further comprises heating the meat to a temperature of up to about 110° F.

3. The method of claim 1 wherein heating the meat trimmings further comprises heating the meat to a temperature of up to about 105° F.

4. The method of claim 1 wherein the separating the meat trimmings further comprises centrifuging the meat trimmings and liquefied fat.

5. The method of claim 1 wherein separating the meat trimmings further comprises reducing the fat content of the meat trimmings to less than 10% fat by weight.

6. The method of claim 1 further comprising obtaining meat trimmings from one or more of beef, lamb, pork, chicken, and fish.

7. The method of claim 1 wherein exposing the meat trimmings to a treatment gas includes exposing the meat trimmings to a treatment gas containing about 0.4% to about 10% carbon monoxide by volume.

8. The method of claim 1 wherein exposing the meat trimmings to a treatment gas includes exposing the meat trimmings to a treatment gas containing no greater than about 50% carbon monoxide by volume.

9. The method of claim 1 wherein exposing the meat trimmings to a treatment gas includes exposing the meat trimmings to a treatment gas at a pressure higher than one atmosphere.

10. The method of claim 1 wherein the meat trimmings are heated by using a water jacketed pipe.

11. The method of claim 10 wherein exposing the meat trimmings during heating to a treatment gas further comprises bubbling the treatment gas into the water jacketed pipe.

12. The method of claim 1 wherein exposing the meat trimmings to a treatment gas includes exposing the meat trimmings to a treatment gas containing from about 10% to about 20% carbon monoxide by volume.

13. The method of claim 1 wherein exposing the meat trimmings to a treatment gas includes exposing the meat trimmings to a treatment gas containing from about 20% to about 30% carbon monoxide by volume.

14. The method of claim 1 wherein exposing the meat trimmings to a treatment gas includes exposing the meat trimmings to a treatment gas containing from about 30% to about 40% carbon monoxide by volume.

15. The method of claim 1 wherein exposing the meat trimmings to a treatment gas includes exposing the meat trimmings to a treatment gas containing from about 40% to about 50% carbon monoxide by volume.

16. A method for making fat reduced beef from meat trimmings comprising:

grinding meat trimmings not previously exposed to an artificial atmosphere comprising carbon monoxide, into a desired size;

heating the meat trimmings to a temperature of up to 120 F for a desired amount of time to liquefy the fat wherein the trimmings are exposed to a treatment gas containing between about 0.4% and about 50% of carbon monoxide by volume during heating wherein carbon monoxide binds to the myoglobin in the meat product to reduce the effect of discoloration caused by heating;

separating the meat trimmings from the liquefied fat and packaging the meat trimmings wherein the resulting meat trimmings have been transformed into a fat reduced beef protein ingredient; and packaging the meat trimmings.

17. The method of claim 16 wherein exposing the meat trimmings to a treatment gas includes exposing the meat trimmings to a treatment gas containing about 0.4% to about 10% carbon monoxide by volume.

18. The method of claim 16 wherein exposing the meat trimmings to a treatment gas includes exposing the meat trimmings to a treatment gas containing no greater than about 50% carbon monoxide by volume.

19. The method of claim 16 wherein exposing the meat trimmings to carbon monoxide further comprises exposing the meat trimmings to carbon monoxide at a pressure higher than one atmosphere.

20. A method for improving the color of a heated meat product comprising exposing the meat to a treatment gas containing between about 0.4% and about 50% of carbon monoxide by volume during heating of the meat to a temperature up to 120 F to liquefy a fat portion, wherein the carbon monoxide binds to the myoglobin in the meat product to reduce the effect of discoloration caused by heating.

21. The method of claim 20 further comprising exposing the meat trimmings to carbon monoxide during the packaging.

* * * * *

UNITED STATES PATENT AND TRADEMARK OFFICE
CERTIFICATE OF CORRECTION

| | | |
|---|---|---|
| PATENT NO. | : 8,158,176 B2 | Page 1 of 1 |
| APPLICATION NO. | : 11/922967 | |
| DATED | : April 17, 2012 | |
| INVENTOR(S) | : Rudy Steiner | |

It is certified that error appears in the above-identified patent and that said Letters Patent is hereby corrected as shown below:

On Title page 2, item (56); in column 2, line 7, delete "Hoithaus," and insert -- Holthaus, --, therefor.

On Title page 2, item (56); in column 2, line 25, delete "78F-21" and insert -- 76F-21 --, therefor.

On Title page 2, item (56); in column 2, line 43, delete "htm>." and insert -- html>. --, therefor.

On Title page 3, item (56); in column 1, line 9, delete "Tuljtefaars," and insert -- Tuljteflaars, --, therefor.

On Title page 3, item (56); in column 1, line 23, after "<URL:" delete "http//vww." and insert -- http//www. --, therefor.

On Title page 3, item (56); in column 1, line 23, after "rdb/opa" delete "8083." and insert -- g083 --, therefor.

On Title page 3, item (56); in column 1, line 28, delete "8" and insert -- & --, therefor.

On Title page 3, item (56); in column 1, line 33, delete "Recjprocal" and insert -- Reciprocal --, therefor.

On Title page 3, item (56); in column 1, line 40, delete "Processina" and insert -- Processing --, therefor.

On Title page 3, item (56); in column 1, line 48, delete "wiffik." and insert -- www. --, therefor.

On Title page 3, item (56); in column 1, line 49, delete "html." and insert -- html>. --, therefor.

On Title page 3, item (56); in column 2, line 40, delete "Cocked" and insert -- Cooked --, therefor.

Signed and Sealed this
Twenty-sixth Day of June, 2012

David J. Kappos
*Director of the United States Patent and Trademark Office*